US012636969B2

(12) United States Patent
Liang

(10) Patent No.: US 12,636,969 B2
(45) Date of Patent: May 26, 2026

(54) AUTONOMOUS MOBILE CHARGING MANAGEMENT VEHICLE

(71) Applicant: PATEO CONNECT+ Technology (Shanghai) Corporation, Shanghai (CN)

(72) Inventor: Chen Liang, Shanghai (CN)

(73) Assignee: PATEO CONNECT+ Technology (Shanghai) Corporation, Shanghai (CN)

(*) Notice: Subject to any disclaimer, the term of this patent is extended or adjusted under 35 U.S.C. 154(b) by 112 days.

(21) Appl. No.: 18/592,634

(22) Filed: Mar. 1, 2024

(65) Prior Publication Data

US 2024/0198845 A1 Jun. 20, 2024

Related U.S. Application Data

(63) Continuation of application No. PCT/CN2021/135002, filed on Dec. 2, 2021.

(30) Foreign Application Priority Data

Sep. 3, 2021 (CN) .......................... 202111033892.1

(51) Int. Cl.
B60L 53/68 (2019.01)
B60L 53/57 (2019.01)
(Continued)

(52) U.S. Cl.
CPC .............. B60L 53/68 (2019.02); B60L 53/57 (2019.02); B60L 53/63 (2019.02); B60P 1/022 (2013.01);
(Continued)

(58) Field of Classification Search
CPC .......... B60L 53/68; B60L 53/57; B60L 53/63; B60L 53/30; B60P 1/022; B60P 1/435;
(Continued)

(56) References Cited

U.S. PATENT DOCUMENTS 10,245,993 B1 * 4/2019 Brady ....................... B60P 7/13

FOREIGN PATENT DOCUMENTS

| CN | 1756713 A | 4/2006 |
| CN | 202728043 U | 2/2013 |

(Continued)

OTHER PUBLICATIONS

CN 111634203 A Machine English translation. (Year: 2020).*

(Continued)

*Primary Examiner* — Michael C Zarroli
(74) *Attorney, Agent, or Firm* — Anova Law Group, PLLC

(57) ABSTRACT

An autonomous mobile charging management vehicle is configured to carry a plurality of mobile charging carts. The autonomous mobile charging management vehicle includes a container, a ramp, and a sorting device. The container is configured to accommodate the plurality of mobile charging carts. The ramp is rotatably arranged on one side of the container and is rotatable to a ground where the management vehicle is located to provide a travel path for the mobile charging cart to enter the container. The sorting device is configured to generate an order for the plurality of mobile charging carts to enter the container according to current power of each mobile charging cart of the plurality of mobile charging carts and send instructions to the plurality of mobile charging carts to cause the plurality of mobile charging carts to enter the container in the order.

19 Claims, 11 Drawing Sheets

(51) Int. Cl.

| | |
|---|---|
| *B60L 53/63* | (2019.01) |
| *B60P 1/02* | (2006.01) |
| *B60P 1/43* | (2006.01) |
| *B60P 3/08* | (2006.01) |
| *H02J 7/00* | (2026.01) |

(52) U.S. Cl.
CPC ................. *B60P 1/435* (2013.01); *B60P 3/08* (2013.01); *H02J 7/0042* (2013.01)

(58) Field of Classification Search
CPC .. B60P 3/08; B60P 3/00; H02J 7/0042; Y02T 10/70; Y02T 10/7072; Y02T 90/12
See application file for complete search history.

(56) References Cited

FOREIGN PATENT DOCUMENTS

| | | | |
|---|---|---|---|
| CN | 103619689 | A | 3/2014 |
| CN | 105984366 | A | 10/2016 |
| CN | 206436842 | U | 8/2017 |
| CN | 107472407 | A | 12/2017 |
| CN | 108945179 | A | 12/2018 |
| CN | 109228913 | A | 1/2019 |
| CN | 110770129 | A | * 2/2020 ............... B60S 5/06 |
| CN | 111491825 | A | 8/2020 |
| CN | 111634203 | A | 9/2020 |
| CN | 113232535 | A | 8/2021 |
| JP | 2015001933 | A | 1/2015 |
| WO | 2019125395 | A1 | 6/2019 |

OTHER PUBLICATIONS

CN 110770129 A Machine English translation (Year: 2020).*
The World Intellectual Property Organization (WIPO) International Search Report for PCT/CN2021/135002 May 13, 2022 6 Pages (including translation).

* cited by examiner

AUTONOMOUS MOBILE CHARGING MANAGEMENT VEHICLE

CROSS-REFERENCE TO RELATED APPLICATION

The present disclosure is a continuation of International Application No. PCT/CN2021/135002, filed Dec. 2, 2021, which claims priority to Chinese Patent Application No. 202111033892.1, filed on Sep. 3, 2021, the entire contents of both of which are incorporated herein by reference.

TECHNICAL FIELD

The present disclosure relates to the vehicle charging technology field and, more particularly, to an autonomous mobile charging management vehicle.

BACKGROUND

Electric vehicles are widely used. An existing electric vehicle requires a charging station for charging. The charging station is connected to a power system. After the electric vehicle is electrically coupled with the charging station, the electric vehicle can be charged. However, the charging station is usually fixed and depends on an infrastructure of a charging facility. In addition, the vehicle can only be charged at a fixed location, which is a problem for a vehicle that cannot find a suitable charging station or a vehicle in a suburban area or an area without a charging station. To solve the problem that fixed charging stations are insufficient, mobile charging technology is provided. With the mobile charging technology, a mobile charging vehicle is provided to charge electric vehicles.

However, a mobile charging vehicle usually charges one electric vehicle and takes a certain space, even a charging position. A charging vehicle needs to be provided to manage the mobile charging vehicle.

SUMMARY

Embodiments of the present disclosure provide an autonomous mobile charging management vehicle. The disclosure can be configured to carry a plurality of mobile charging carts. The autonomous mobile charging management vehicle includes a container, a ramp, and a sorting device. The container is configured to accommodate the plurality of mobile charging carts. The ramp is rotatably arranged on one side of the container and is rotatable to a ground where the management vehicle is located to provide a travel path for the mobile charging cart to enter the container. The sorting device is configured to generate an order for the plurality of mobile charging carts to enter the container according to current power of each mobile charging cart of the plurality of mobile charging carts and send instructions to the plurality of mobile charging carts to cause the plurality of mobile charging carts to enter the container in the order.

Embodiments of the present disclosure provide an electronic apparatus including one or more processors and one or more memories. The one or more memories store a computer program that, when executed by the one or more processors, cause the one or more processors to accommodate the plurality of mobile charging carts, rotate a ramp to a ground where the management vehicle is located to provide a travel path for a mobile charging cart to enter a container, and generate an order for the plurality of mobile charging carts to enter the container according to current power of each mobile charging cart of the plurality of mobile charging carts and send instructions to the plurality of mobile charging carts to cause the plurality of mobile charging carts to enter the container in the order.

The above description is only an overview of the technical solution of the present disclosure. To better understand the technical means of the present disclosure, the present disclosure can be implemented according to the content of the specification. Embodiments of the present disclosure are described below to cause the purposes, features, and advantages to be more obvious.

DETAILED DESCRIPTION OF EMBODIMENTS

Embodiments of the present disclosure are described in detail below in connection with the accompanying drawings. The present disclosure can be implemented in various manners and is not limited to the described embodiments. On the contrary, the described embodiments are intended to cause the present disclosure to be better understood. The accompanying drawings and embodiments of the present disclosure are merely exemplary and are not used to limit the scope of the present disclosure.

In the description of embodiments of the present disclosure, the term "comprising" and a similar expression should be understood to be open-ended, i.e., "including but not limited to." The term "based on" should be understood as "at least partially based on." The term "an embodiment" or "the embodiment" should be understood as "at least one embodiment." The terms "first," "second," etc., can refer to different or same objects. The following can also include other explicit and implicit definitions.

As mentioned above, a mobile charging vehicle is usually small and is not suitable for long-distance travel. A carrier vehicle needs to be provided to realize long-distance transportation of the mobile charging vehicle. The carrier vehicle can automatically load and unload, store, and manage the mobile charging vehicle. Embodiments of the present disclosure are described according to the accompanying drawings.

Figure 1:
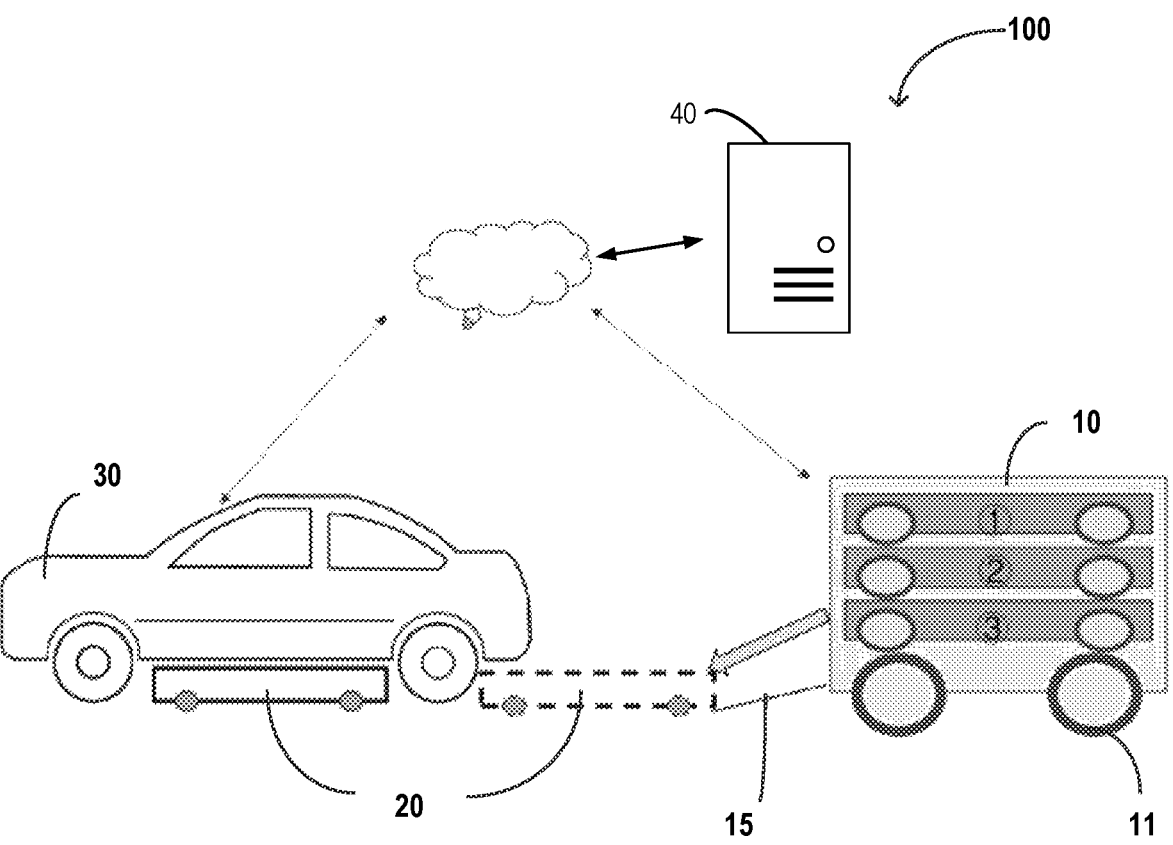
FIG. 1 is a schematic structural diagram of a vehicle charging management system according to some embodiments of the present disclosure.

FIG. 1 is a schematic structural diagram of vehicle charging management system 100 according to some embodiments of the present disclosure. The system 100 includes an autonomous mobile charging management vehicle 10 (a management vehicle 10), an electronic apparatus 40, and an electric vehicle 30. The management vehicle 10 can accommodate and carry a plurality of mobile charging cart 20. The autonomous mobile charging management vehicle 10 can communicate with a cloud control platform 40. The electronic apparatus 40 can communicate with the electric vehicle 30.

The electronic apparatus 40 can be implemented in a form of a server or a computing device. The electronic apparatus 40 can also include a general server, a network node such as a large service machine, a cloud computation apparatus such as a virtual machine (VM), and any other apparatus that provides computing power.

The management vehicle 10 can include a driving system and can be a transportation tool having a certain level of autonomous driving ability. The management vehicle 10 can include a wheel 11, an electric motor, and a steering system, and can drive a vehicle to move autonomously. The management vehicle 10 can include, for example, a computing apparatus. The computing apparatus can have the ability to communicate with another apparatus based on one or more communication technologies. In some embodiments, the management vehicle 10 can include a remote communication function and/or a local communication function. For example, when the electronic apparatus 40 is local, the management vehicle 10 can communicate with the electronic apparatus 40 and/or the mobile charging cart 20 via local communication. When the electronic apparatus 40 is in the cloud, the management vehicle 10 can communicate with the electronic apparatus 40 and/or the mobile charging cart 20 via remote communication.

The vehicle charging management system 100 shown in FIG. 1 is merely an exemplary embodiment of the vehicle charging management system to facilitate describing embodiments of the present disclosure. The vehicle charging management system is not limited and the can include another network architecture.

Similar to the management vehicle 10, the mobile charging cart 20 can include a driving system and can be a transportation tool with a certain level of autonomous driving capability. The mobile charging cart 20 can include a wheel, an electric motor, and a steering system, which can drive the vehicle to move autonomously. The mobile charging cart 20 can have the ability to communicate with another apparatus based on one or more communication technologies. The mobile charging cart 20 can communicate with the management vehicle 10 through local or remote communication.

In some embodiments, the mobile charging cart 20 can be in a form of a flat vehicle, which facilitates the transportation of the mobile charging cart 20 and the charging coupling between the mobile charging cart 20 and a to-be-charged vehicle. For example, in some embodiments, an autonomous charging vehicle 10 can drive to a bottom side of the to-be-charged vehicle and establish a charging connection with the to-be-charged vehicle. The shape and size of the autonomous charging vehicle 10 can be suitable for vehicle charging. The mobile charging cart 20 illustrated in the figure can be in a flat vehicle, which is merely an example. The mobile charging cart 20 can have any other suitable shape, such as a disc shape.

When the mobile charging cart 20 is in a status of not performing a charging task, the mobile charging cart 20 can be accommodated by the management vehicle 10. When the mobile charging cart 20 performs a charging task, the mobile charging cart 20 can automatically drive away from the management vehicle 10 via a ramp 15 of the management vehicle 10. For example, the mobile charging cart 20 can be charging-coupled with a charging vehicle 30 to charge the charging vehicle 30. After the mobile charging cart 20 completes the charging task, the mobile charging cart 20 can return to the management vehicle 10 and automatically drive into the management vehicle 10 via the ramp 15 of the management vehicle 10 for maintenance and transportation. The management vehicle 10 can realize a management function and a transportation function for the mobile charging cart 20.

Figure 2:
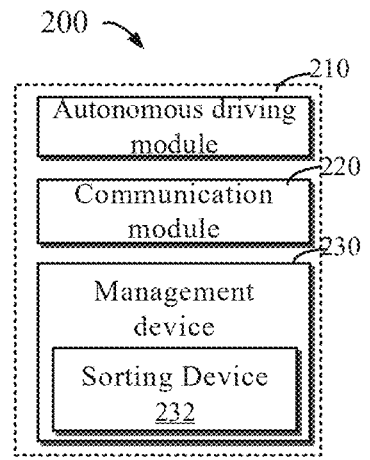
FIG. 2 is a schematic functional diagram of an autonomous mobile charging management vehicle according to some embodiments of the present disclosure.

FIG. 2 is a schematic functional diagram of an autonomous mobile charging management vehicle 200 according to some embodiments of the present disclosure. As shown in FIG. 2, the computing apparatus of the management vehicle 200 includes an autonomous driving module 210, a communication module 220, and a management module 230. The autonomous driving module 210 can be configured to implement an autonomous driving function of the management vehicle 200. For example, the autonomous driving module 210 can include functional modules for environment monitoring, path planning, and driving control. The communication module 220 can be configured to implement local and/or remote communication between the management vehicle 200 and the external apparatus (such as a mobile charging cart 20, a navigation server, etc.). The management module 230 can be configured to manage the mobile charging cart 20, including loading management, charging dispatch management, and recovery and maintenance management of the mobile charging cart 20. The management module 230 can also be configured to exchange the mobile charging cart with the mobile charging cart of another management vehicle.

The management vehicle of embodiments of the present disclosure can realize loading, transportation management, dispatch management, and maintenance management of the mobile charging cart 20. In some embodiments, the management vehicle can carry and transport a plurality of mobile charging carts 20 and realize remote transportation of the mobile charging carts 20. Thus, the charging vehicle can be configured to charge the electric vehicle. After the mobile charging cart 20 finishes charging, the mobile charging cart 20 can be loaded. Thus, the mobile charging cart 20 can continue to charge at a next charging location, or the mobile charging cart 20 can be performed with maintenance. With the management vehicle of embodiments of the present disclosure, the management of the mobile charging cart can be optimized, the management vehicle can be compact, and the loading capacity of the management vehicle can be improved.

In some embodiments, the management module 230 can include a sorting device 232. The sorting device 232 can be configured to generate an order in which the mobile charging carts enter the management vehicle based on the current power of each mobile charging cart of the plurality of mobile charging carts. The sorting device 232 can be configured to send instructions to the plurality of mobile charging carts to cause the plurality of mobile charging carts to enter the management vehicle according to the order. Due to the limitation of the internal structure of the management vehicle, the storage space of the management vehicle can be limited. In the management vehicle of embodiments of the present disclosure, through the sorting device 232, the arrangement efficiency of the mobile charging carts can be improved in the limited internal space of the management vehicle to improve the efficiency in managing the space of the management vehicle.

In some embodiments, the sorting device 232 can be configured to sort the mobile charging carts so that the mobile charging cart currently with low power can enter the management vehicle before the mobile charging cart currently with high power. Thus, the mobile charging cart with low power can be stored in a position that is not affected when other mobile charging carts enter and exit. Therefore, the efficiency of the management vehicle can be maximally optimized.

In some embodiments, the management module 230 can further include a dispatch device. The dispatch device can be configured to respond to a charging instruction and/or a recovery instruction to instruct the mobile charging cart, which enters the storage space at a later time, to drive out of the management vehicle before the mobile charging cart, which enters the storage space at an earlier time. For the mobile charging carts already loaded in the management vehicle, the mobile charging carts can be dispatched according to a predetermined rule, which can also greatly improve the dispatch efficiency of the mobile charging carts. The low efficiency and waste of energy can be avoided by preventing the mobile charging cart from often driving into or out of the management vehicle.

In some embodiments, the dispatch device can be configured to respond to a charging instruction and dispatch the mobile charging cart to perform the charging task according to the remaining power of each mobile charging cart of the plurality of mobile charging carts. Due to the limitation of the charging capacity of the mobile charging cart, after a long time of use, the power of the mobile charging cart may not be sufficient to effectively charge the to-be-charged vehicle. Thus, an appropriate mobile charging cart can be selected according to the remaining power of the mobile charging cart to perform the charging task, which prevents the charging task from being left unfinished due to dispatching an inappropriate mobile charging cart.

In some embodiments, the dispatch device can also be configured to respond to the recovery instruction and dispatch the mobile charging cart to perform the recovery task according to the remaining power of each mobile charging cart of the plurality of mobile charging carts. The recovery task can include instructing the mobile charging cart to enter another management vehicle. In some embodiments, the management vehicle can further also include a recovery device. The recovery device can be configured to respond to the recovery instruction and allow mobile charging carts from other management vehicles to enter the management vehicle. As such, the management vehicle can exchange corresponding mobile charging carts with other management vehicles according to the power of the mobile charging carts carried by the management vehicle. Thus, the mobile charging carts can be managed more efficiently. For example, mobile charging carts that are not capable of performing the charging tasks can be recovered together, while mobile charging carts that are capable of performing the charging tasks can be managed together. Thus, the management vehicle can be prevented from mixing up the mobile charging carts that are capable of performing the charging tasks and the mobile charging carts that are not capable of performing the charging tasks. Therefore, the management resource may not be wasted, and the charging cost can be reduced.

Figure 3:
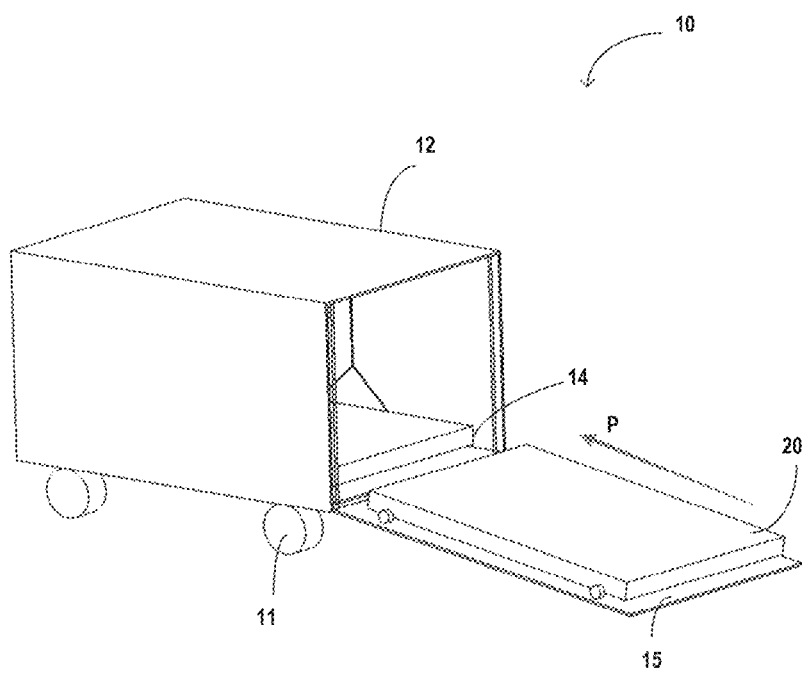
FIG. 3 is a schematic structural diagram of an autonomous mobile charging management vehicle according to some embodiments of the present disclosure.

FIGS. 3 to 6 illustrate schematic structural diagrams of an autonomous charging management vehicle according to some embodiments of the present disclosure. As shown in FIGS. 3 to 6, the management vehicle 10 carries a plurality of mobile charging carts 20. The management vehicle 10 includes a container 12 and a ramp 15. The container 12 can be configured to accommodate the plurality of mobile charging carts 20. The ramp 15 can be rotatably arranged at the container 12. The ramp 15 can be configured at a first pivot position and a second pivot position. At the first pivot position, the ramp 15 can be rotated to the ground where the management vehicle 10 is located as shown in FIG. 3. Thus, the mobile charging cart 20 can autonomously drive into the container 12 along the ramp 15, e.g., shown by arrow P in FIG. 3. The mobile charging cart 20 can autonomously drive onto a horizontal support frame 14 of the container 12.

Figure 6:
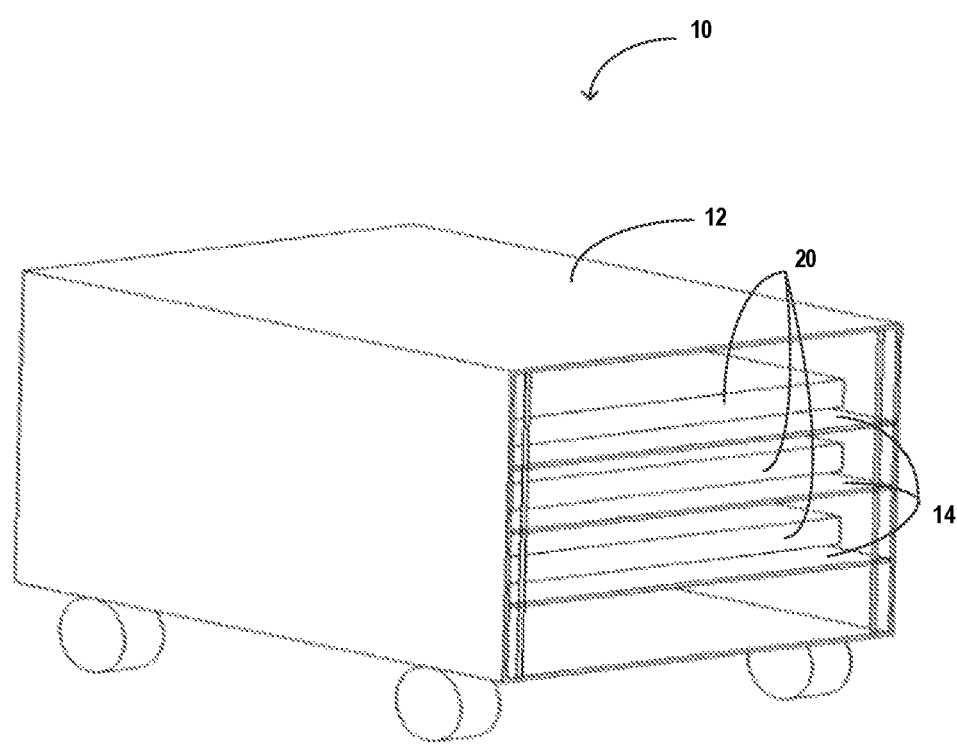
FIG. 6 is a schematic diagram of an autonomous mobile charging management vehicle after loading according to some embodiments of the present disclosure.

In some embodiments, as shown in FIG. 6, the plurality of mobile charging carts 20 are horizontally stacked in the container 12. As shown in FIG. 6, the management vehicle 10 further includes a plurality of horizontal support frames 14 arranged in the container 12. In some embodiments, the plurality of horizontal support frames 14 can be aligned and stacked. Each horizontal support frame 14 can be configured to carry at least one mobile charging cart 20. With the structure, mobile charging carts 20 as many as possible can be accommodated in a space as small as possible. Thus, the accommodation rate of the mobile charging carts 20 can be improved.

In some embodiments, the management vehicle 10 further includes a lifting mechanism. The lifting mechanism can be configured to lift all horizontal support frames 14 except for the bottom one. The horizontal support frame 14 can be configured to support the mobile charging cart 20. In some embodiments, the lifting mechanism can be configured to lift all horizontal support frames 14 of the plurality of horizontal support frames, and the horizontal. For example, a track or a position limiting mechanism can be arranged at the horizontal support frame 14. After the mobile charging cart 20 drives onto the horizontal support frame 14, the mobile charging cart 20 can be maintained or fixed to prevent the mobile charging cart 20 from moving. By lifting the horizontal support frame 14, the position of the mobile charging cart 20 can be adjusted in the container 12.

Figure 4:
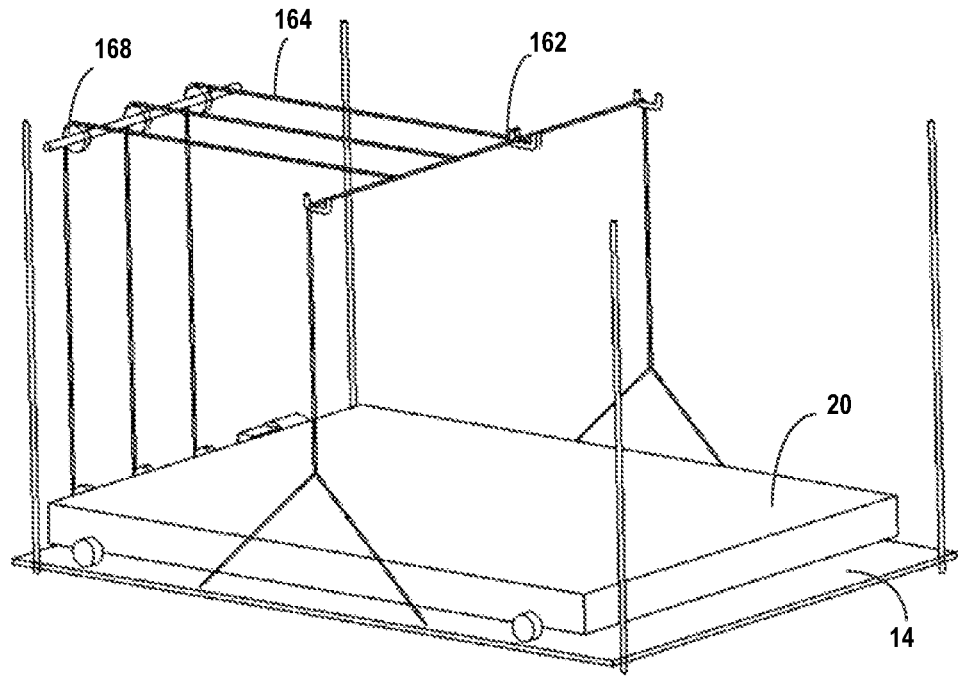
FIG. 4 is a schematic diagram showing a first view angle of a loading structure of an autonomous mobile charging management vehicle according to some embodiments of the present disclosure.
Figure 5:
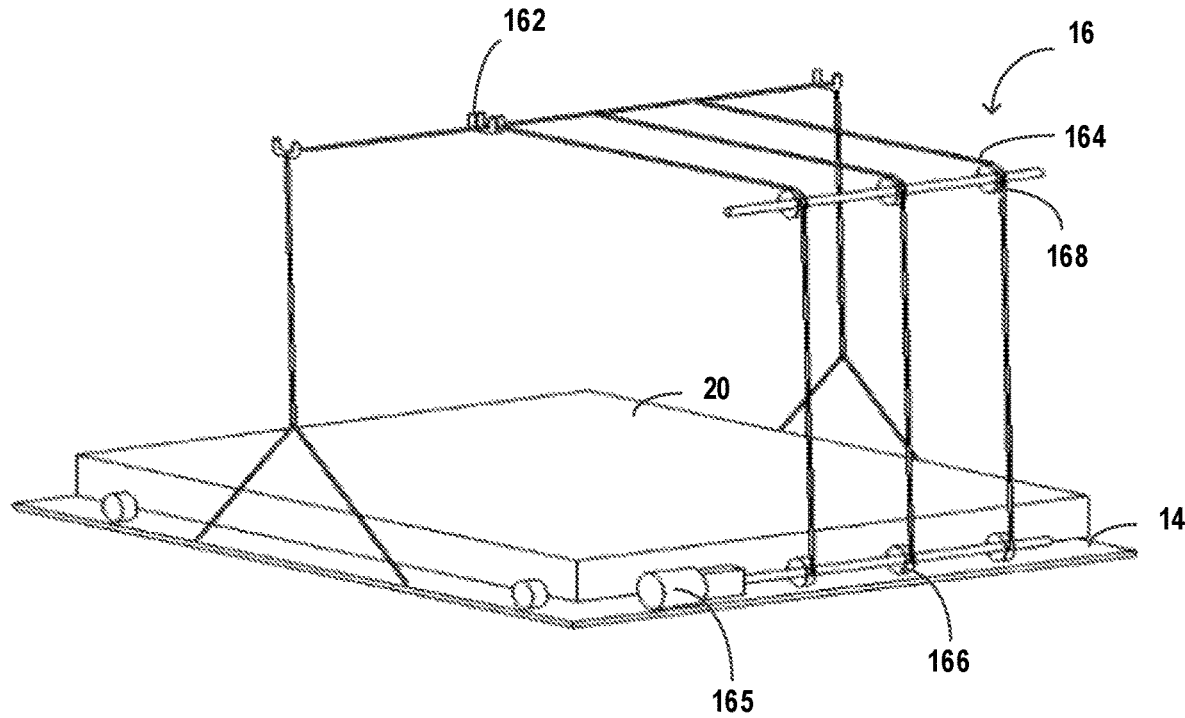
FIG. 5 is a schematic diagram showing a second view angle of a loading structure of an autonomous mobile charging management vehicle according to some embodiments of the present disclosure.

The lifting mechanism can be implemented in various manners. In some embodiments, the lifting mechanism can include a chain or rope drive mechanism. The lifting mechanism can ascend and descend the horizontal support frame 14 using a chain or rope. FIG. 4 and FIG. 5 illustrate merely an exemplary lifting mechanism of embodiments of the present disclosure. The structure shown in FIG. 4 and FIG. 5 are exemplary. According to the teaching of the present disclosure, another embodiment of the lifting mechanism can be also in the scope of the present disclosure.

As shown in FIG. 4 to FIG. 5, the lifting mechanism includes a plurality of rope devices 16 and a driving device. After the mobile charging cart 20 enters the container 12, the rope device 16 can be locked with the horizontal support frame 14 that carries the mobile charging cart 20. In embodiments shown in FIG. 4 and FIG. 5, the rope device 16 includes a driving pulley, a guiding pulley, and a hook device. The driving device includes an electric motor 165, a reduction gearbox coupled to the electric motor, and an output shaft. The output shaft can drive the rope device 16 to raise the horizontal support frame 14 to a predetermined height.

In embodiments of the present disclosure, the management vehicle 10 exemplarily accommodates three mobile charging carts 20. Taking the three mobile charging carts 20 as an example, an operation method of the management vehicle 10 in embodiments of the present disclosure can be described. When the management vehicle 10 accommodates the three mobile charging carts 20, the management vehicle 10 includes at least two sets of rope devices 16 configured to ascend and descend two mobile charging carts 20, respectively. The management vehicle 10 can generate an order for the plurality of mobile charging carts 20 to enter the container 12 according to the current power of each mobile charging cart 20. The mobile charging carts 20 can enter the container 12 according to the order scheduled by the management vehicle 10.

In response to an instruction from the management module 230, after the first mobile charging cart 20 enters the container 12, the first mobile charging cart 20 can move to a top horizontal support frame of the stacked three horizontal support frames 14. The first mobile charging cart 20 can be maintained at the horizontal support frame 14. The horizontal support frame 14 can be locked with the rope device 16. The driving device can be actuated to drive the horizontal support frame 14 to ascend to a predetermined top position of the container 12.

After the first mobile charging cart 20 enters the container, in response to an instruction from the management module 230, a second mobile charging cart 20 can enter the container 12 and can be moved to a second horizontal support frame of the stacked three horizontal support frames 14. The mobile charging cart 20 can be maintained at the horizontal support frame 14. The second horizontal support frame 14 can be locked with the rope device 16. The driving device can be actuated to drive the second horizontal support frame 14 to rise to a predetermined second-top position of the container 12.

Similarly, after the second mobile charging cart 20 enters the container 12, in response to an instruction from the management module 230, a third mobile charging cart 20 can enter the container 12 and can be moved to the bottom horizontal support frame of the stacked three horizontal support frames 14. The mobile charging cart 20 can be maintained at the horizontal support frame 14. Then, the three mobile charging carts 20 are loaded.

When the mobile charging cart 20 needs to be unloaded from the container 12, the mobile charging cart 20 can also leave the container in a predetermined order. For example, in some embodiments, in response to an instruction from the management module 230, the third mobile charging cart 20 located at the bottom horizontal support frame of the stacked three horizontal support frames 14 can leave the container. Then, the second mobile charging cart 20 located at the second horizontal support frame 14 of the stacked three horizontal support frames 14 can be descended to the bottom position through the lifting mechanism and then leave the container. Similarly, the first mobile charging cart 20 located at the top horizontal support frame of the stacked three horizontal support frames 14 can be descended to the bottom position through the lifting mechanism and then leave the container.

In the management vehicle of embodiments of the present disclosure, the mobile charging cart can be ascended and descended by a lifting structure arranged in the management vehicle. The position of the mobile charging cart can be adjusted through the entering and exiting of the mobile charging cart. The overall structure of the management vehicle can be compact, and the storage capacity can be large.

Figure 7:
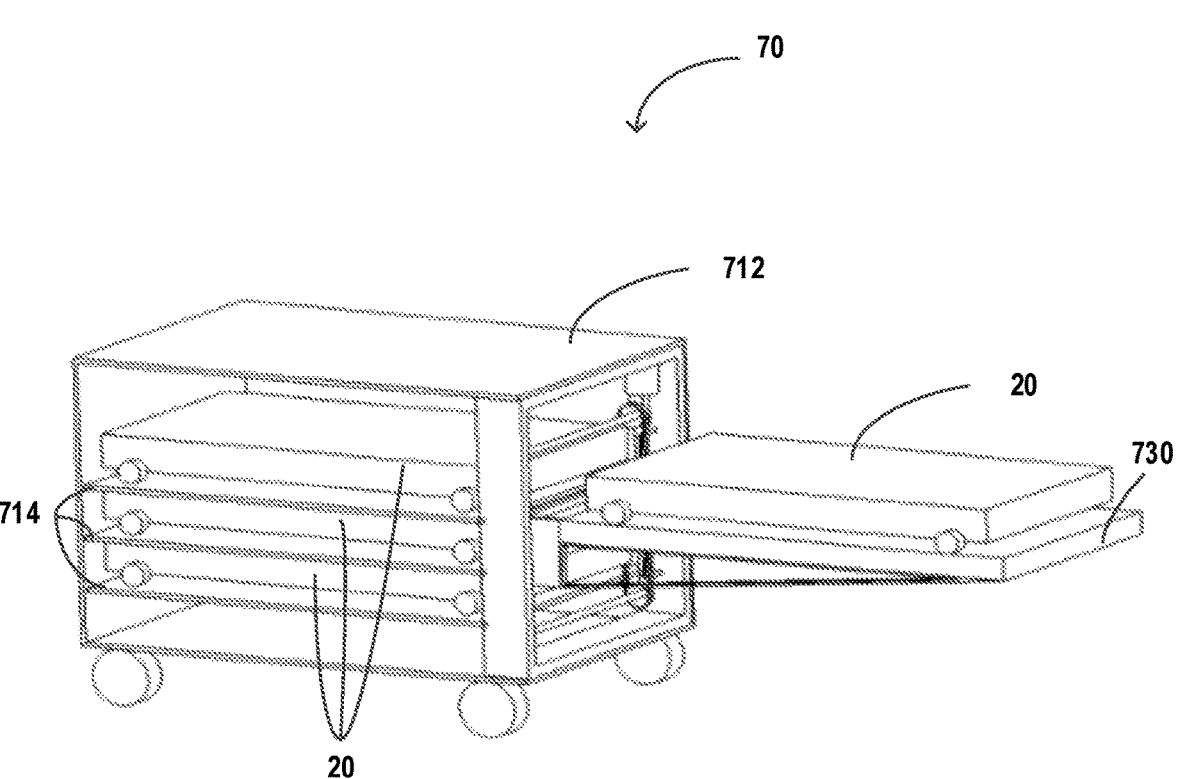
FIG. 7 is a schematic structural diagram of an autonomous mobile charging management vehicle according to some embodiments of the present disclosure.
Figure 8:
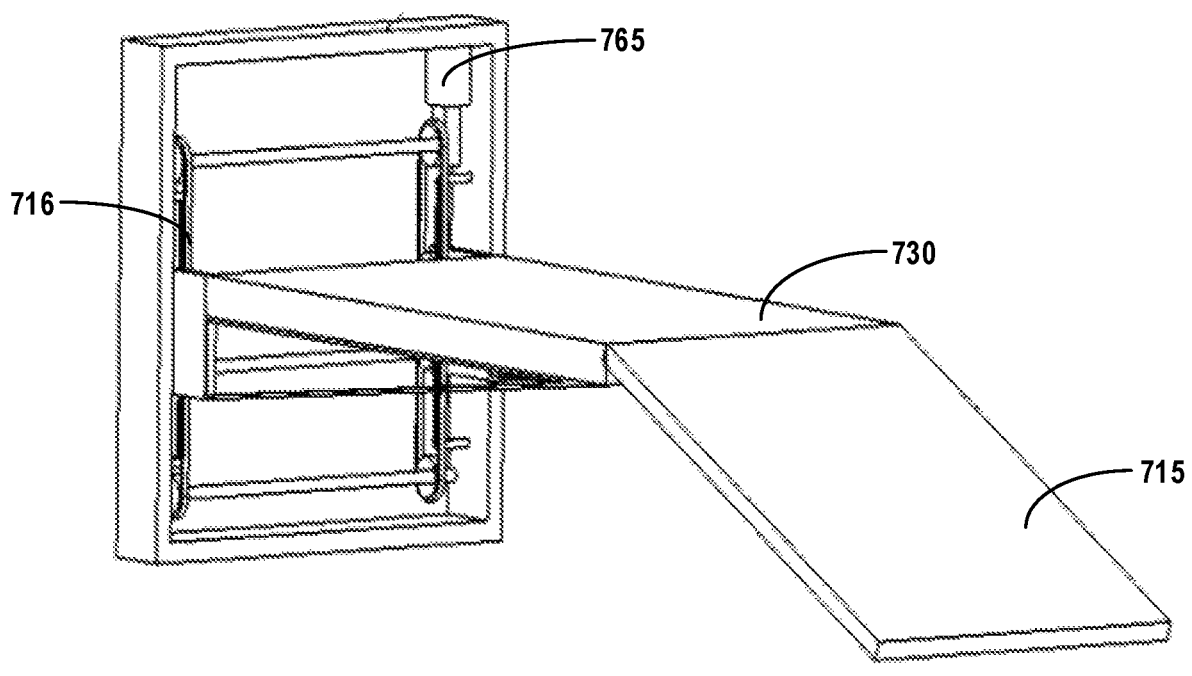
FIG. 8 is a schematic diagram showing a loading structure of an autonomous mobile charging management vehicle according to some embodiments of the present disclosure.
Figure 9:
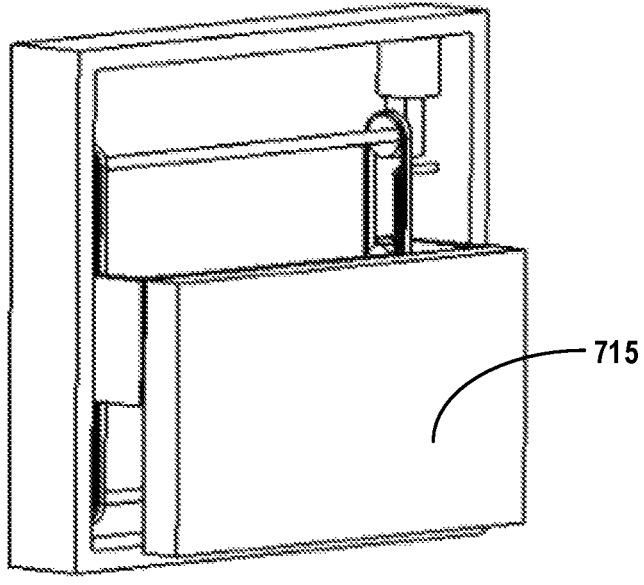
FIG. 9 is a schematic diagram of an autonomous mobile charging management vehicle after a lifting platform is accommodated according to some embodiments of the present disclosure.
Figure 10:
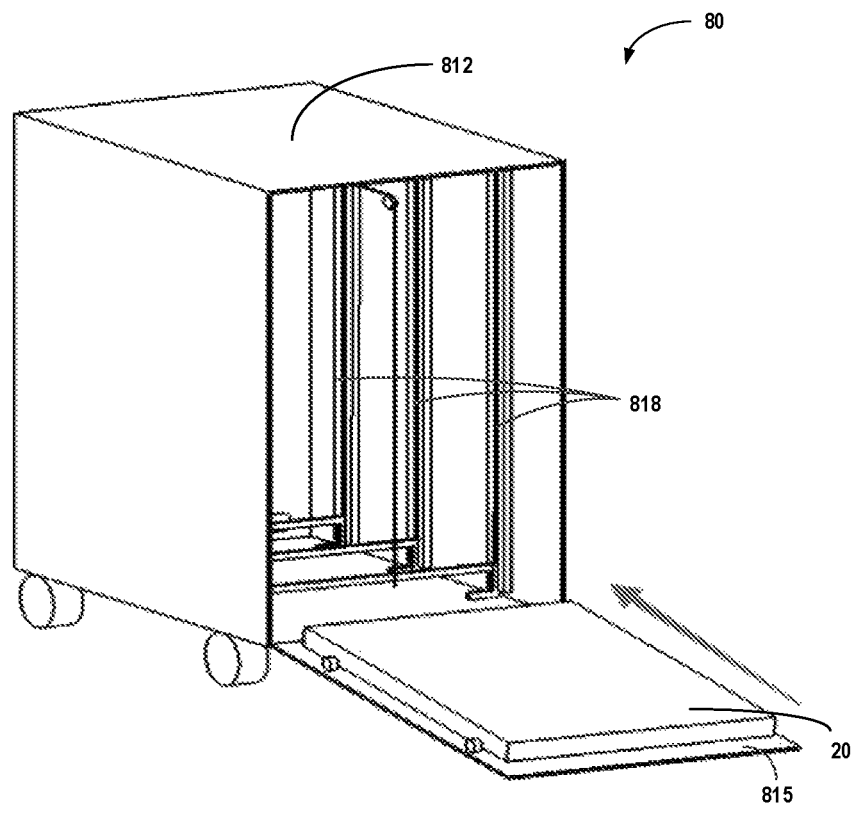
FIG. 10 is a schematic structural diagram of an autonomous mobile charging management vehicle according to some embodiments of the present disclosure.
Figure 11:
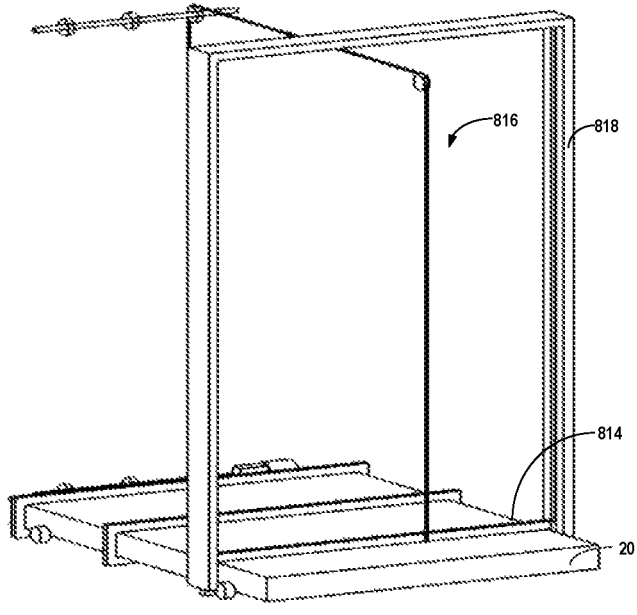
FIG. 11 is a schematic diagram showing a first status of a loading structure of an autonomous mobile charging management vehicle according to some embodiments of the present disclosure.
Figure 12:
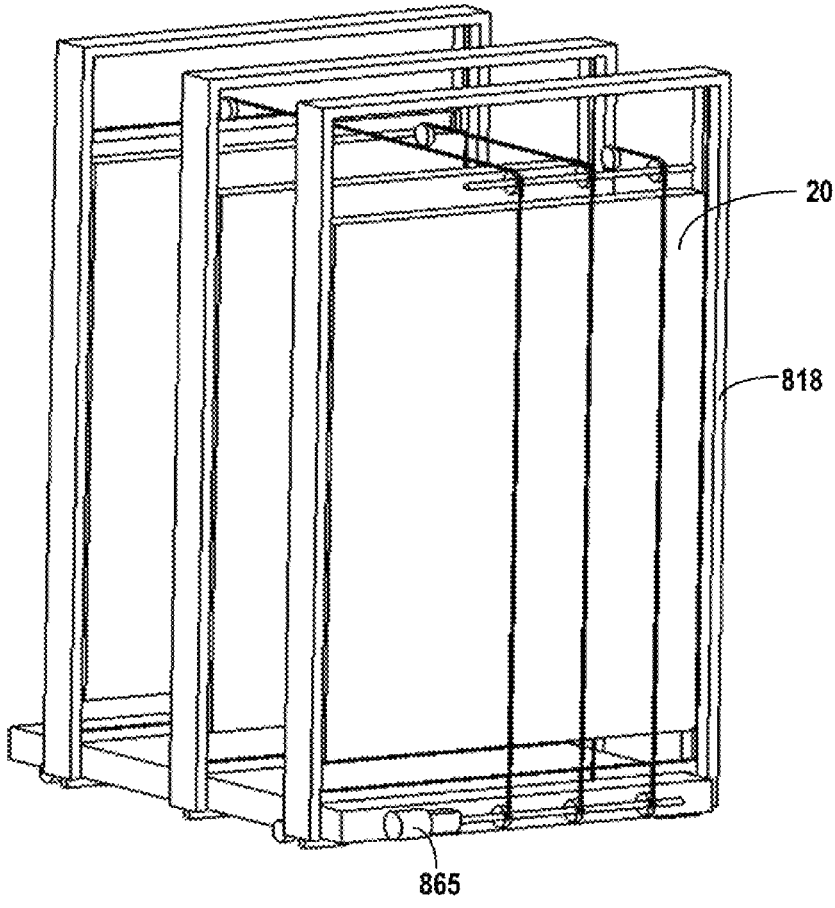
FIG. 12 is a schematic diagram showing a second status of a loading structure of an autonomous mobile charging management vehicle according to some embodiments of the present disclosure.
Figure 13:
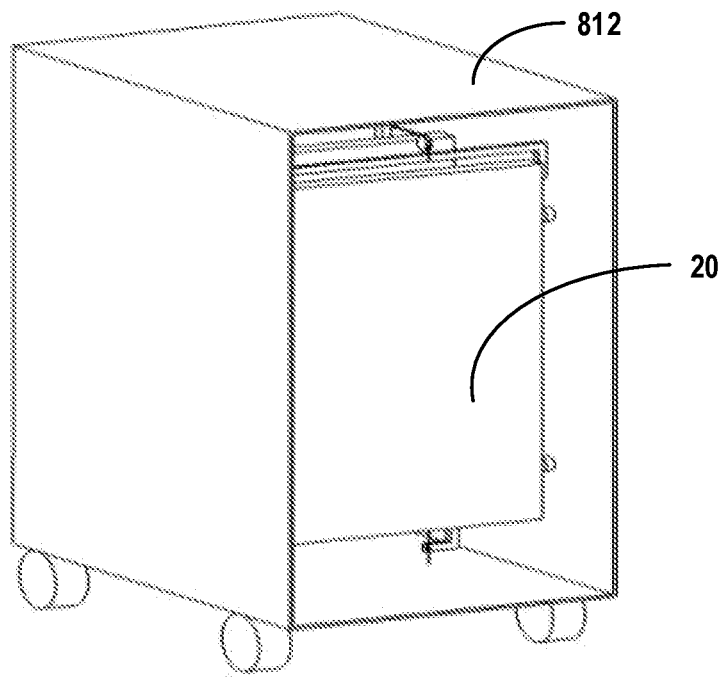
FIG. 13 is a schematic diagram of an autonomous mobile charging management vehicle after loading according to some embodiments of the present disclosure.

FIGS. 7 to 9 show schematic structural diagrams of an autonomous mobile charging management vehicle 70 according to some embodiments of the present disclosure. The embodiment shown in FIG. 7 is similar to the embodiment shown in FIG. 3. A difference between FIG. 7 and FIG. 3 includes that an external lifting platform 730 is configured to load and unload the mobile charging cart 20 for the management vehicle 70 in FIG. 7.

As shown in FIG. 7 and FIG. 8, the management vehicle 70 includes a container 712. The container 712 includes a plurality of horizontal support frames 714. The plurality of mobile charging carts 20 can be supported at the horizontal support frames 714. The management vehicle 70 further includes the lifting platform 730 arranged on one side of the container. The lifting platform 730 can be configured to be driven to move along the vertical direction to be aligned with a corresponding horizontal support frame 714 at a predetermined position. With the lifting platform 730, the mobile charging cart 20 can be arranged in the container 712. The lifting platform 730 can be driven by various suitable driving mechanisms. In some embodiments, for example, the lifting platform can be driven by an electric motor 765 and a rope device 716. In some other embodiments, ascending and descending of the lifting platform can be implemented by other suitable driving devices. Since the function of the lifting platform 730 is similar to the function of the lifting mechanism in FIG. 3, the lifting platform 730 is not described in detail here.

In some embodiments, a ladder plate 715 can be arranged at one end of the lifting platform 730 to cause the mobile charging cart 20 to move to the lifting platform through a ladder plate 715. Then, the mobile charging cart 20 can be ascended or descended to a predetermined position by the lifting platform 730. In some embodiments, the lifting platform 730 can be foldable. Thus, the lifting platform can be at a folded storage position after the mobile charging cart enters the container. Thus, the space occupied by the lifting platform 730 can be reduced.

In addition to being arranged horizontally in the container, the mobile charging cart can also be arranged vertically or at an angle. FIGS. 10 to 13 show schematic structural diagrams of an autonomous mobile charging management vehicle 80 according to some embodiments of the present disclosure.

The management vehicle 80 includes a container 812. The container 812 includes a plurality of suspension devices arranged sequentially along a longitudinal direction of the container 812 (i.e., a direction in which the mobile charging cart 20 enters the container 812). Each suspension device can be configured to support the mobile charging cart in a vertical attitude or a tilted attitude. The mobile charging cart can be arranged through suspension. In addition to the advantage of the space efficiency of the container, impurities at the back of the mobile charging cart can be easily removed. For example, wireless charging safety can be improved. With the suspension devices, the mobile charging cart 20 can be arranged in the container 812. The suspension devices can be driven by various driving mechanisms.

In some embodiments, the suspension device includes a plurality of locking brackets 814. Each locking bracket 814 can be configured to engage with a locking member arranged near the front side of the mobile charging cart 20. Therefore, the locking bracket 814 can be locked together with the mobile charging cart 820 in a releasable manner. The suspension device also includes a plurality of rope devices 816 and an electric motor. An end of the rope of each rope device can be configured to be connected to the locking bracket 814. The electric motor can be configured to drive the rope of the rope device to move to suspend the locking bracket 814 in a vertical or inclined posture in the container or place the locking bracket 814 in a horizontal posture from the vertical or inclined posture. For example, the suspension device can be driven by the electric motor and the rope device. In some other embodiments, the suspension device can be implemented by other suitable driving devices.

In some embodiments, the container 812 also includes a plurality of guide devices 818 extending in the vertical direction. A guide device 818 can be configured to be connected to a corresponding locking bracket 814 during a vertical lifting process of the locking bracket 814 to guide the locking bracket 814 to move along a vertical direction. Thus, the movement attitude of the mobile charging cart 20 can be controlled. In some embodiments, for example, the guide device 818 can have a frame structure including a guide groove. In some other embodiments, the guide device 818 can be another appropriate mechanism.

An operation manner of the suspension device can be similar to the operation manner of the lifting mechanism and lifting platform above. In some embodiments, in response to an instruction from the management module inside the management vehicle, the mobile charging carts 20 can enter the container in sequence and can be suspended and arranged by the suspension devices. When the management module instructs the mobile charging cart 20 to leave the container to perform the charging task, the suspension device can respond to the corresponding instruction to change a suspended mobile charging cart 2 from a suspended state to a flat state in sequence. Thus, the mobile charging cart 2 can autonomously leave the container.

For example, the mobile charging cart can be arranged in the vertical posture. However, in some other embodiments, the mobile charging cart can also be arranged in the inclined posture.

Figure 14:
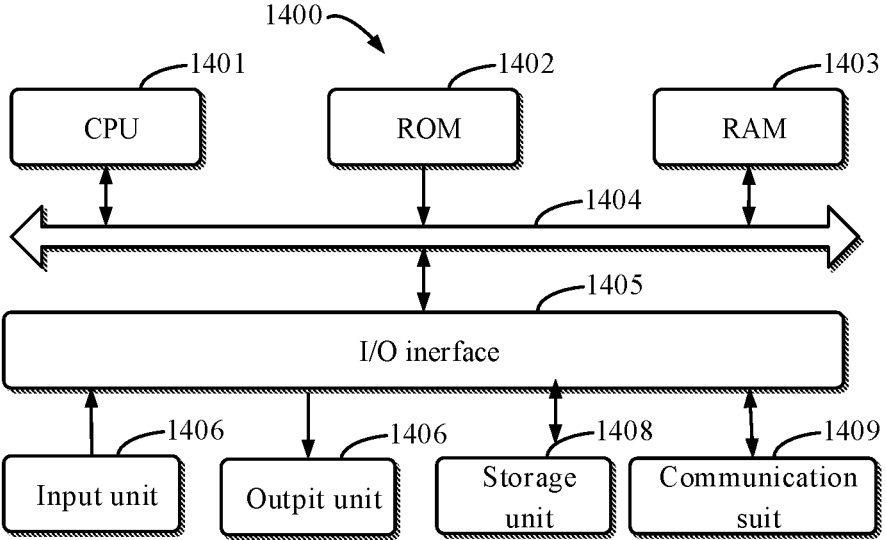
FIG. 14 is a schematic block diagram showing a computation apparatus of a management vehicle according to some embodiments of the present disclosure.

FIG. 14 is a schematic block diagram showing an electronic apparatus for the management vehicle according to some embodiments of the present disclosure. The electronic apparatus can include various digital computation apparatuses, such as a laptop computer, a desktop computer, a workstation, a personal digital assistant, a server, a blade server, a large-scale computer, and another suitable computer. The electronic apparatus can also include various mobile devices, such as a personal digital processor, a cellular phone, a smartphone, a wearable apparatus, and another similar computation device. Members, connections and relationships of the members, and functions of the members shown in the specification can be exemplary and are not intended to limit the description of the specification and/or the present disclosure.

FIG. 14 is a schematic block diagram showing a computation apparatus 1400 of a management vehicle according to some embodiments of the present disclosure. As shown in FIG. 14, the computation apparatus 1400 includes a central processing unit (CPU) 1401. The CPU can be configured to perform various actions and processing according to a computer program instruction in a read-only memory (ROM) 1402 or a computer program instruction loaded from a storage unit 1408 to a random access memory (RAM) 1403. In RAM 1403, various programs and data that are required by the operation of the storage apparatus 1400 can be stored. CPU 1401, ROM 1402, and RAM 1403 are mutually connected through a bus 1404. An input/output (I/O) 1405 is also connected to the bus 1404.

A plurality of members of the apparatus 1400 can be connected to the I/O interface 1405 and include an input unit 1406, such as a keyboard, mouse, etc., an output unit 1407, such as various types of displays, speakers, etc., a storage unit 1408, such as disks, optical disks, etc., and a communication unit 1409, such as a network card, modem, wireless communication transceiver, etc. The communication unit 1409 can allow the apparatus 1400 to exchange information/data with other apparatuses through computer networks such as the Internet and/or various telecommunications networks.

The processing unit 1401 can be configured to execute the various methods and processes above. For example, in some embodiments, the process can be implemented as a computer software program that is tangibly included in a machine-readable medium, such as the storage unit 1408. In some embodiments, a part of or all of the computer program can be loaded and/or installed on the apparatus 1400 via the ROM 1402 and/or communication unit 1409. When the computer program is loaded into the RAM 1403 and executed by the CPU 1401, one or more steps of the process above can be performed. In some other embodiments, the CPU 1401 can be configured to perform the process in any other suitable manners (e.g., by firmware).

The functions above can be at least partially performed by one or more hardware logic members. For example, non-limiting examples of hardware logic members that can be used can include field-programmable gate arrays (FPGAs), application-specific integrated circuits (ASICs), application-specific standard products (ASSPs), system-on-a-chip (SOC) devices, and complex programmable logic devices (CPLDs).

Program codes for implementing the method of the present disclosure can be written in any combination of one or more programming languages. The program codes can be provided to a processor or a controller of a general-purpose computer, a special-purpose computer, or another programmable data processing device to cause the functions/operations specified in the flowchart and/or block diagram to be implemented when the program codes are executed by the processor or controller. The program codes can be executed entirely on the machine, partially on the machine, as a standalone software package partially on the machine and partially on a remote machine, or entirely on a remote machine or server.

In the present disclosure, the machine-readable medium can be a tangible medium that can include or store programs for use by or in connection with an instruction execution system, an apparatus, or a device. The machine-readable medium can be a machine-readable signal medium or a machine-readable storage medium. The machine-readable medium can include, but is not limited to, electronic, magnetic, optical, electromagnetic, infrared, or semiconductor systems, apparatuses, or devices, or any suitable combination thereof. In some embodiments, the machine-readable storage media can include electrical connections based on one or more wires, portable computer disks, hard drives, random-access memory (RAM), read-only memory (ROM), erasable programmable read-only memory (EPROM or flash memory), optical fibers, compact disc read-only memories (CD-ROMs), optical storage apparatuses, magnetic storage apparatuses, or any suitable combination thereof.

In some embodiments, the system and technology described here can be implemented on the computer to provide an interaction with the user. The computer can include a display device configured to display information for the user (e.g., a cathode ray tube (CRT) or a liquid-crystal display (LCD) monitor), a keyboard, and a pointing device (e.g., a mouse or a trackball). The user can provide the input to the computer through the keyboard and the pointing device. Another type of device can be further configured to provide the interaction with the user. For example, the feedback provided to the user can be any type of sensory feedback (e.g., a visual feedback, an auditory feedback, or a tactile feedback). The input from the user can be received in any form (including a voice input, an audio input, or a tactile input).

The system and technology can be implemented in a computation system that includes a backend member (such as a data server), a computation system that includes a middleware member (such as an application server), a computation system that includes a frontend member (e.g., a user computer with a graphical user interface or a web browser through which the user can interact with the implementation of the system and technology described herein), or any combination thereof. The members of the system can be interconnected by digital data communication of any form or medium (such as a communication network). An example of a communication network can include a local area network (LAN), a wide area network (WAN), and the Internet.

A computer system can include a client terminal and a server. The client terminal and the server are typically away from each other and communicate with each other through a communication network. A client-server relationship can be generated by running computer programs on corresponding computers that have the client-server relationship.

In addition, although operations are described in a particular order, such operations need to be performed in a particular order or sequentially, or the operations need to be performed to achieve a desired result. In some embodiments, multitasking and parallel processing can be beneficial. Similarly, although specific implementation details can be included in the above description, these details should not be considered as limiting the scope of the present disclosure. Certain features described in the context of separate embodiments can also be implemented and combined in a single embodiment. On the contrary, various features described in the context of the single embodiment can also be implemented separately or in any suitable sub-combination in embodiments of the present disclosure.

Although the present disclosure is described using specific structural features and/or method logic actions, the subject limited by the appended claims may not be limited to the above specific features or actions. On the contrary, the specific features and actions above are merely exemplary embodiments of the appended claims.

What is claimed is:

1. An autonomous mobile charging management vehicle, configured to carry a plurality of mobile charging carts, comprising:
   a container configured to accommodate the plurality of mobile charging carts;
   a ramp rotatably arranged on one side of the container and being rotatable to a ground where the management vehicle is located to provide a travel path for the mobile charging cart to enter the container; and
   a sorting device configured to generate an order for the plurality of mobile charging carts to enter the container according to current power of each mobile charging cart of the plurality of mobile charging carts and send instructions to the plurality of mobile charging carts to cause the plurality of mobile charging carts to enter the container in the order, wherein the sorting device is configured to sort in a manner that a mobile charging cart with low current power enters the management vehicle first, and a mobile charging cart with high current power enters the management vehicle later.

2. The management vehicle according to claim 1, further comprising:
   a plurality of horizontal support frames aligned and stacked in the container, each of the plurality of horizontal support frames being configured to carry at least one mobile charging cart.

3. The management vehicle according to claim 2, further comprising:
   a lifting mechanism at least capable of ascending and descending horizontal support frames other than a bottom horizontal support frame of the plurality of horizontal support frames.

4. The management vehicle according to claim 3, wherein the lifting mechanism includes:
   a plurality of rope devices, each rope device being connected to a corresponding horizontal support frame; and
   a driving device configured to drive a rope of the rope device to vertically ascend and descend a horizontal support frame.

5. The management vehicle according to claim 2, further comprising:
   a lifting platform arranged on one side of the container and configured to be driven to move along a vertical direction to be aligned with a corresponding horizontal support frame at a predetermined position, wherein:
      the ramp is arranged on an end of the lifting platform to cause the mobile charging cart to move to the lifting platform through the ramp and be ascended or descended to the predetermined position through the lifting platform.

6. The management vehicle according to claim 5, wherein the lifting platform is foldably arranged to be in a folded storage position after the mobile charging cart enters the container.

7. The management vehicle according to claim 1, further comprising:
   a plurality of vertical suspension devices arranged sequentially in a longitudinal direction in the container, each suspension device being configured to support the mobile charging cart in a vertical posture or an inclined posture.

8. The management vehicle according to claim 7, wherein the suspension device includes:
   a plurality of locking brackets, each of the plurality of locking brackets being configured to be connected to a locking member arranged near a front side of the mobile charging cart to be releasably locked with the mobile charging cart;

a plurality of rope devices, an end of a rope of each of the plurality of rope devices being configured to be connected to the locking bracket; and an electric motor configured to drive the rope of the rope device to move to suspend the locking bracket in a vertical posture or an inclined posture in the container or to place the locking bracket from the vertical posture or the inclined posture to a horizontal posture.

9. The management vehicle according to claim 8, further comprising:

a plurality of guide devices extending in a vertical direction and configured to be connected to corresponding locking brackets during a vertical ascending or descending process of the lock brackets to guide the locking brackets to move in the vertical direction to further control postures of the mobile charging carts.

10. The management vehicle according to claim 1, further comprising:

a communication device configured to communicate with the plurality of mobile charging carts to obtain current power information of the plurality of mobile charging carts to send the current power information to the sorting device.

11. The management vehicle according to claim 1, further comprising a dispatch device configured to, in response to a charging and/or recovery instruction, instruct a mobile charging cart that enters the container later to exit the management vehicle earlier than a mobile charging cart that enters the container earlier.

12. The management vehicle according to claim 11, wherein the dispatch device is further configured to:

in response to the charging instruction, dispatching the mobile charging cart to perform a charging task according to remaining power of each mobile charging cart of the plurality of mobile charging carts.

13. The management vehicle according to claim 11, wherein the dispatch device is further configured to:

in response to the recovery instruction, dispatch the mobile charging cart to leave the management vehicle to perform a recovery task according to remaining power of each mobile charging cart of the plurality of mobile charging carts, the recovery task including instructing the mobile charging cart to enter another management vehicle.

14. The management vehicle according to claim 1, further comprising:

a recovery device configured to, in response to a recovery instruction, allow a mobile charging cart from another management vehicle to enter the management vehicle.

15. An electronic apparatus comprising:

one or more processors; and one or more memories storing a computer program that, when executed by the one or more processors, causes the one or more processors to:

accommodate the plurality of mobile charging carts;

rotate a ramp to a ground where the management vehicle is located to provide a travel path for a mobile charging cart to enter a container; and generate an order for the plurality of mobile charging carts to enter the container according to current power of each mobile charging cart of the plurality of mobile charging carts and send instructions to the plurality of mobile charging carts to cause the plurality of mobile charging carts to enter the container in the order.

16. The apparatus according to claim 15, wherein the one or more processors are further configured to:

align and stack a plurality of horizontal support frames in the container, each of the plurality of horizontal support frames being configured to carry at least one mobile charging cart.

17. The apparatus according to claim 16, wherein the one or more processors are further configured to:

ascend and descend horizontal support frames other than a bottom horizontal support frame of the plurality of horizontal support frames.

18. The apparatus according to claim 17, wherein the one or more processors are further configured to:

drive a rope of a rope device to vertically ascend and descend a horizontal support frame.

19. The apparatus according to claim 16, wherein the one or more processors are further configured to:

drive a lifting platform arranged on one side of the container to move along a vertical direction to be aligned with a corresponding horizontal support frame at a predetermined position, wherein:

the ramp is arranged on an end of the lifting platform to cause the mobile charging cart to move to the lifting platform through the ramp and be ascended or descended to the predetermined position through the lifting platform.

\*　\*　\*　\*　\*